United States Patent [19]
Crossman et al.

[11] 3,760,899
[45] Sept. 25, 1973

[54] INFLATED AIR BEARING

[75] Inventors: Richard L. Crossman, Tallmadge;
Richard R. Fisher, Cuyahoga Falls;
Harry T. Kifor, Canton, all of Ohio

[73] Assignee: Goodyear Aerospace Corporation,
Akron, Ohio

[22] Filed: May 6, 1971

[21] Appl. No.: 140,769

[52] U.S. Cl. ............................. 180/125, 180/128
[51] Int. Cl. ............................................ B60v 1/00
[58] Field of Search .................... 180/116, 125, 127, 180/128

[56] References Cited
UNITED STATES PATENTS

| | | | |
|---|---|---|---|
| 3,524,517 | 8/1970 | La Fleur | 180/124 |
| 3,481,424 | 12/1969 | Barr | 180/128 |
| 3,161,247 | 12/1964 | Mackie | 180/124 |
| 3,301,342 | 1/1967 | Jones | 180/128 |
| 3,613,821 | 10/1971 | Kerr | 180/125 |

*Primary Examiner*—Gerald M. Forlenza
*Assistant Examiner*—D. W. Keen
*Attorney*—J. G. Pere and L. A. Germain

[57] ABSTRACT

Disclosed is a load supporting device of the air cushion type. The device is formed of a dual wall inflatable fabric which is sealed at its edges and coated on its upper and side surfaces with an air-tight coating. The lower surface of the device is porous. The device is inflated by a low or high pressure air supply and the air escaping through the porous lower surface supports the device with its load a small distance above the ground surface. The device may be used in moving and lifting heavy loads, for supporting patients, and for other uses. Another primary use is for distributing heavy loads over larger areas, this would permit moving heavy loaded commercial or military trucks over bridges and so forth because of decreased concentrated wheel loads.

5 Claims, 3 Drawing Figures

PATENTED SEP 25 1973　　　　　　　　　　　　　　　　3,760,899

INVENTORS
RICHARD L. CROSSMAN
RICHARD R. FISHER
HARRY T. KIFOR

BY
*Oldham & Oldham*
ATTORNEYS

INFLATED AIR BEARING

The use of surface effect devices for the lifting and handling of loads is known in the art. However, the devices of this type heretofore proposed possess certain drawbacks which make them of limited usefulness. When large and heavy objects are to be handled, it is preferable that the lifting device and the object be raised only a very small distance from the ground surface so that the possibility of tipping or unbalancing the load is minimized. The devices of the prior art, however, employ either skirt portions or generally impervious structures with one or more holes or slots permitting escape of the low pressure air. Either of these type of devices, when lifted only a short space above the surface, are likely to become snagged or require excessively high air flow to pass over any projections or irregularities of the surface.

Since the prior art devices employ a relatively high skirt to confine the supporting air cushion, there is the problem that, if the skirt becomes snagged on a projection of the surface or if the device passes over a groove in the surface which extends beyond the edges of the device, a loss of the supporting air cushion will result. The device thus loses its supporting capability and must be moved free of the surface irregularity before it can be reinflated.

Another disadvantage of the prior art devices is their inability to support a heavy load when in an uninflated condition. Many of these prior devices are subject to crushing or damage when heavy loads are placed on them in their uninflated conditions. Also, some of the prior devices, when supporting a heavy load, concentrate this loading on a small surface area, thereby requiring high air pressure and high air flow. Also, many of these devices have rigid top structure portions and thus require a substantial area for storage.

It is the primary object of the present invention to provide an inflatable air bearing type support device which overcomes the above-mentioned disadvantages of the prior art devices.

It is also the object of the invention to provide an air bearing device which is of simple and light weight construction.

A further object of the invention is the provision of an air bearing load support device which provides uniform loading over a substantial surface area with minimum pressure and minimum air flow loss.

Another object of the invention is the provision of an air bearing device which has a non-rigid structure thereby permitting the device to conform to various configurations or surface irregularities.

It is also an object of the present invention to provide an air bearing device which has a continuous and porous lower surface permitting the controlled escape of air pressure so that the supporting capability of the device is not appreciably effected by grooves or other surface irregularities.

The above and other objects of the invention which will become apparent as the description proceeds are achieved by providing an air bearing load support device which is formed of a dual walled inflatable fabric. The ends of the fabric are sealed and the upper and side surfaces of the fabric are coated to be air tight. A connection is provided to a source of compressed air and, when the device is inflated, it serves as a plenum chamber with the air escaping through the porous uncoated lower surface of the device to support the load on the thin cushion of air.

For a more complete understanding of the invention and of the objects and advantages thereof reference should be had to the following specification and the accompanying drawing wherein there is shown a preferred embodiment of the invention.

Figure 1:
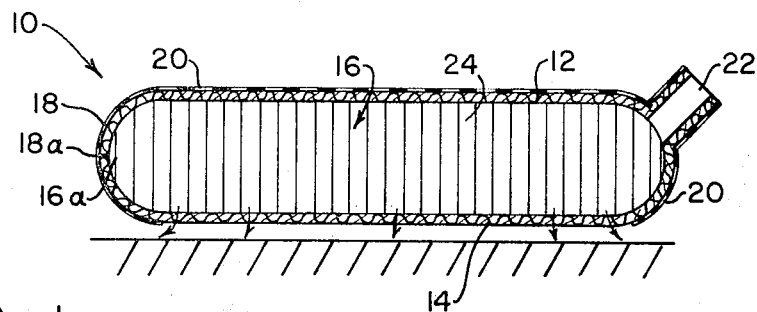
FIG. 1 is a vertical cross-section through a typical inflated air bearing of the present invention.

The inflatable air bearing device is designated generally by the reference numeral 10 and is formed of a dual wall thread connected fabric which has upper and lower fabric walls 12 and 14 which are connected at intervals by drop threads 16. Such a fabric is manufactured by the Goodyear Aerospace Corporation of Akron, Ohio. The drop threads 16a at the edges of the air bearing 10 are shortened to form the sides 18 of the device with the upper and lower fabric walls 12 and 14 being connected at seams 18a. The fabric used to fabricate the air bearing 10 is sufficiently porous to permit the escape of air through the fabric. A coating 20 is applied to the top wall 12, the sides 18, and the peripheral edges of the bottom wall 14 to seal these portions in an air tight manner. Any suitable composition may be used to provide the sealing coating 20 so long as the composition provides an air tight seal and is not susceptible to cracking or flaking. The air bearing 10 is provided with a suitable inlet 22 for connecting the device to a compressed air source.

When the device 10 is to be used to support a load compressed air is supplied through the inlet 22 inflating the device with the interior 24 serving as a plenum chamber to achieve uniform distribution of the air throughout the device 10. The uncoated porous lower surface 14 permits the controlled escape of the compressed air uniformly across the underside of the air bearing 10 thus forming a thin air cushion between the device and the base surface. This air cushion permits the load supported by the device 10 to be moved with only minimum ground friction. The compressed air need be only of low pressure. For example, a 3 foot square mat inflated to a pressure of 0.15 psi is capable of supporting a 200 lb. vertical load and a towing force of only a few pounds is sufficient to move the air bearing and the 200 lb. load supported thereby.

Since the bottom surface 14 of the air bearing 10 is continuous without any slots or holes or any downwardly projecting skirts or ribs, the device will not snag even when moved over a projection or irregularity of the base surface. Rather, the lower surface 14 will merely deflect over the projection. Also, since the rate of escape of the pressurized air is controlled by the porosity of the lower surface 14, the air bearing 10 can pass over a groove or the like in the base surface with minimum loss of air pressure or load supporting capability.

The volume of air 24 within the air bearing 10 serves to distribute any uneven loadings on the upper surface 12 uniformly across the area of the lower surface 14 so that uniform loading is supplied to the base surface. The fabric layers 12 and 14 are flexible and, as pointed out above, this aids in preventing the air bearing 10 from becoming snagged on any irregularities of the base surface. The flexibility of the fabric 12 is also advantageous in supporting irregularly contoured loads since the upper surface 12 can conform to the irregular contour without causing an undue loading stress on any one point. This feature of the air bearing device 10 makes it ideally suitable for the supporting of, for example, a bed-ridden individual since the ability of the device 10 to uniformly support the body eliminates the painful sores which are caused by the concentration of weight on small points.

The flexibility of the fabric is also of importance when a heavy load is placed on the deflated air bearing 10 since the upper and lower surfaces 12 and 14 are merely pressed against one another with no damage to the air bearing 10. Also, since the walls of the structure are flexible, the device may be folded or rolled when not in use and thus stored in a minimum area.

Figure 2:
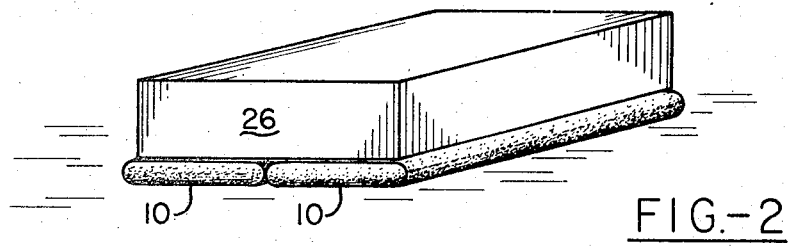
FIG. 2 is a perspective view showing the use of a pair of the inflatable air bearings of FIG. 1 to support and aid in the movement of a large object.

It will be understood that the air bearing 10 may be of any desired shape. Also, two or more units may be used to support and aid in the movement of a large load, as is shown in FIG. 2, where a large load 26 is supported on two air bearings 10.

Obviously, the size and configuration of the uncoated lower surface 14 may be varied as desired to provide a greater or lesser area through which the air escapes to achieve the desired lifting characteristics. Also, the porosity of the fabric may be selected so as to provide the desired rate of escape of air.

Figure 3:
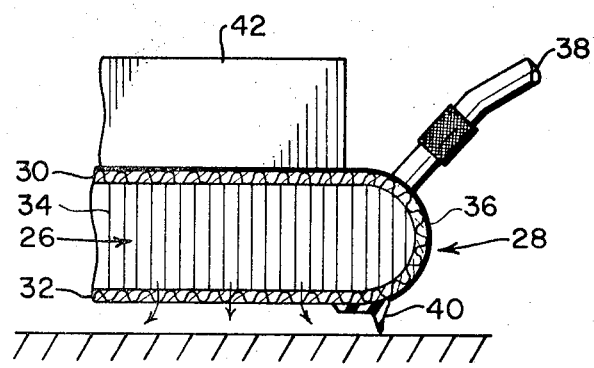
FIG. 3 is a fragmentary vertical cross-section through a modified air bearing.

A slightly modified form of the invention is illustrated in FIG. 3. In this embodiment the air bearing, designated generally by reference numeral 28, is formed of a piece of dual wall inflatable fabric having upper and lower surfaces 30 and 32, respectively, which are connected by drop threads 34. The upper and lower surfaces 30 and 32 are connected together around the periphery of the air bearing to form side walls 36. As in the previously described embodiment, the upper surface 30, side walls 36, and, possibly, the outer edges of the lower surface 32 are coated with an air-impervious coating. An inlet 38 which preferably includes a quick disconnect type coupling is provided to supply compressed air between the upper and lower surfaces 30 and 32. A sealing band or rib 40 is provided on the lower surface 32 adjacent to and surrounding the uncoated portion thereof. This band 40 serves to confine a layer of air under the device 28 to increase its lifting ability and, by increasing the separation between the ground and the lower surface 32, decreasing the possibility that the lower surface 32 will become worn or torn by a sharp projection on the ground. Obviously, a wide range of materials may be used to form the band or rib 40. For example, the rib 40 may be a urethane or rubber strip. Another arrangement would be to employ a cloth skirt to form the band 40.

It is contemplated that when the air bearing is to be used to support a massive or irregularly shaped load, a supporting plate or pad 42 may be provided on the upper surface 30 of the air bearing 28 so as to prevent distortion or possible puncturing of the air bearing. This pad 42 may be of any suitable material, for example, wood, honeycomb metal, or fiber glass. The pad may be either bonded onto the upper surface 30 or merely temporarily positioned thereon.

While only the best known embodiments of the invention have been described in detail, it will be understood that the invention is not so limited but that changes and additions may be made therein and thereto. Reference should therefore be had to the appended claims in determining the true scope of the invention.

What is claimed is:

1. A load supporting device of the fluid bearing type, comprising:
    an air impervious upper wall forming a continuous plane within the confines of its periphery;
    a lower wall of sufficient porosity over at least a portion thereof to permit pressurized fluid to escape therethrough, the lower wall forming a continuous plane within the confines of its periphery which is substantially parallel to the upper wall, wherein the upper and lower walls are the upper and lower surfaces of a dual wall fabric, the upper and lower surfaces being interconnected by drop threads of sufficient length to permit the upper and lower walls to separate from one another upon inflation of the device to provide a plenum chamber therebetween, the upper and lower walls being sealed to one another along their edges; and
    inlet means extending through one of the walls to permit pressurized fluid to be introduced between the upper and lower walls.

2. The fluid bearing type load supporting device as recited in claim 1 wherein the drop threads adjacent to the edges of the upper and lower walls are shortened to contour the edges of the walls together.

3. The fluid bearing type load supporting device as recited in claim 1 wherein the upper and lower walls are flexible, having the ability to conform to irregular contours of an object supported on the device and to irregularities of the supporting surface.

4. A load supporting device of the air bearing type, comprising:
    a piece of dual wall inflatable fabric having porous upper and lower fabric walls connected to one another along the edges thereof, the walls being continuously planar in nature and substantially parallel to each other;
    an air-impervious coating on the upper fabric wall and about the peripheral edges of the lower fabric wall;
    inlet means extending through the upper wall to permit pressurized air to be introduced between the upper and lower walls; and
    a downwardly extending band connected to and extending about the outer surface of the lower fabric wall at the periphery of the uncoated portion thereof, the band preventing engagement of the lower fabric wall with the supporting surface upon which the device is positioned.

5. A load supporting device as recited in claim 4 wherein a load distributing pad is positioned on the upper fabric wall of the device.

* * * * *